United States Patent [19]

Oller

[11] 4,257,462

[45] Mar. 24, 1981

[54] TOOL FASTENING SYSTEM FOR WOODWORKING MACHINES OR THE LIKE

[76] Inventor: Jaime M. Oller, Victor Pradera 43, Tarrasa, Barcelona, Spain

[21] Appl. No.: 114,007

[22] Filed: Jan. 21, 1980

Related U.S. Application Data

[63] Continuation of Ser. No. 913,939, Jun. 8, 1978, abandoned.

[30] Foreign Application Priority Data

Jun. 8, 1977 [ES] Spain ............................ 459.618

[51] Int. Cl.³ .................. B27G 13/00; B26D 1/12; B23B 5/22
[52] U.S. Cl. ..................... 144/218; 144/230; 407/49; 279/83
[58] Field of Search ............. 407/30, 33, 44, 47, 407/49; 144/218, 224, 225, 226, 227, 228, 229, 230, 130, 132; 279/30.83

[56] References Cited

U.S. PATENT DOCUMENTS

| | | | |
|---|---|---|---|
| 321,596 | 7/1885 | Gray ............................... | 144/224 |
| 591,039 | 10/1897 | Harris ............................ | 144/218 |
| 916,527 | 3/1909 | Bengler ......................... | 144/218 |
| 1,072,930 | 9/1918 | Ensign .......................... | 144/224 |
| 1,546,138 | 7/1925 | Lambert ........................ | 144/218 |
| 1,547,087 | 7/1925 | Vickers ......................... | 144/230 |
| 1,797,463 | 3/1931 | Cederholm ................... | 144/230 |
| 1,803,741 | 5/1931 | Walthers et al. ............. | 144/230 |
| 2,836,206 | 4/1958 | Gaskell ......................... | 144/229 |

Primary Examiner—Harrison L. Hinson
Attorney, Agent, or Firm—Blum, Kaplan, Friedman, Silberman & Beran

[57] ABSTRACT

A tool fastening system for woodworking machines or the like wherein the tools or tool collars carry radially directed means for releasably securing the tools or collars to a drive shaft or axle in such a manner that the tools or collars may be positioned at any axial position along the axle regardless of the width of the tool or collar and without the use of spacers.

6 Claims, 5 Drawing Figures

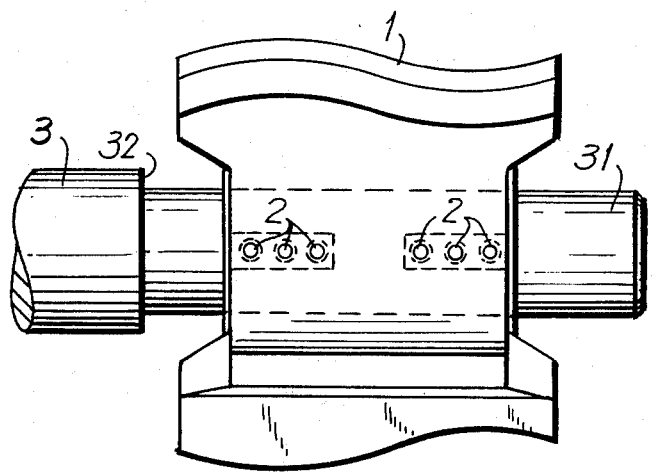
FIG. 1
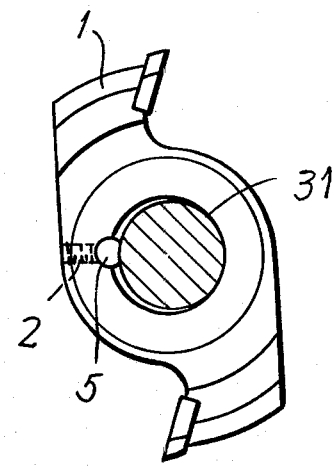
FIG. 2
FIG. 3
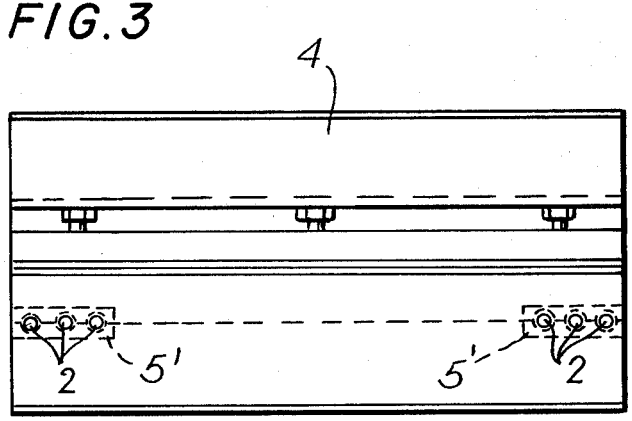

TOOL FASTENING SYSTEM FOR WOODWORKING MACHINES OR THE LIKE

This is a continuation of application Ser. No. 913,939, filed June 8, 1978 now abandoned.

BACKGROUND OF THE INVENTION

In woodworking machines which carry changeable rotary tools, it has generally been the practice to secure the tool on the axle shaft by sliding the tool thereon and tightening it by means of a nut threaded onto the axle shaft. Since different woodworking tools have different widths, it has been necessary to use spacers on opposite sides of the tool in order to take up the space between the shoulder of the axle and the closest position of the threaded nut. This has often presented a problem with respect to precisely locating the tool because the axial position of the tool on the axle is dictated by the number and thickness of available spacers.

SUMMARY OF THE INVENTION

Generally speaking, in accordance with the invention, means are provided to releasably secure rotary tools directly to the axle shaft without the use of spacers and the usual locking nut. In such manner, the axial position of the tool can be determined without regard to available spacers. Several different means are possible for releasably connecting the tool to the axle shaft.

Accordingly, it is an object of this invention to provide an improved tool fastening system for woodworking machines or the like.

Another object of the invention is to provide an improved tool fastening system which eliminates the use of spacers for axially positioning a tool on a drive shaft.

Still another object of the invention is to provide improved means for releasably mounting a rotary tool on an axle shaft.

Still other objects and advantages of the invention will in part be obvious and will in part be apparent from the specification.

The invention accordingly comprises the features of construction, combination of elements, and arrangement of parts which will be exemplified in the construction hereinafter set forth, and the scope of the invention will be indicated in the claims.

BRIEF DESCRIPTION OF THE DRAWINGS

For a fuller understanding of the invention, reference is had to the following description taken in connection with the accompanying drawings, in which:

FIG. 1 is an elevational view of a tool mounted on an axle in accordance with an embodiment of the instant invention;

FIG. 2 is a sectional end view of the combination shown in FIG. 1;

FIG. 3 is an elevational view of a tool holder constructed in accordance with the present invention with tools removably mounted in the tool holder;

DESCRIPTION OF THE PREFERRED EMBODIMENTS

Figure 4:
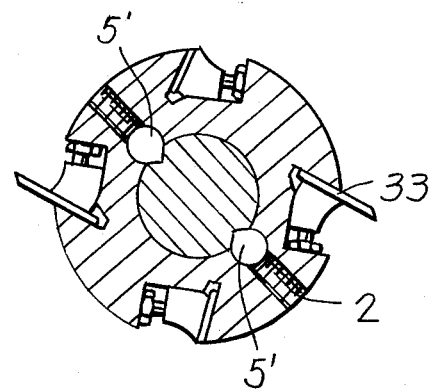
FIG. 4 is a sectional end view of the tool holder of FIG. 3.

Referring first to FIGS. 1 and 2, a tool 1 is shown mounted on an axle shaft 3. The shaft has a reduced mounting portion 21 and a shoulder 22. A plurality of radially directed screws 2 are threaded through tool 1 for engaging a pressure bar 5 and pressing it against mounting portion 31. It will be noted that no spacers are required between shoulder 32 and tool 1 and that the tool can be located at any axial position along mounting portion 31. It should also be noted from FIG. 2 that the play between the tool and the shaft on which it is mounted due to clearance between the inside diameter of the tool and the outside diameter of the shaft is eliminated when screws 2 are tightened so that the precision of the circular centering of the cutting edge of the tool that has been previously obtained when sharpened in a similar mounting arrangement is accurately maintained. Thus it is preferred that screws 2 be axially aligned at a single location so that the mounting arrangement of FIG. 2 results. If, under certain circumstances, it is desired that all play not be on one side when mounted as shown in FIG. 2, the screws can be placed in opposite radial positions or circumferentially.

Referring now to FIGS. 3 and 4, a tool holder 4 is shown as carrying a series of oppositely positioned screws 2 which bear against a pressure bar 5' for engaging the drive shaft. Tools 33 are replaceably mounted in the tool holder in a known manner.

Figure 5:
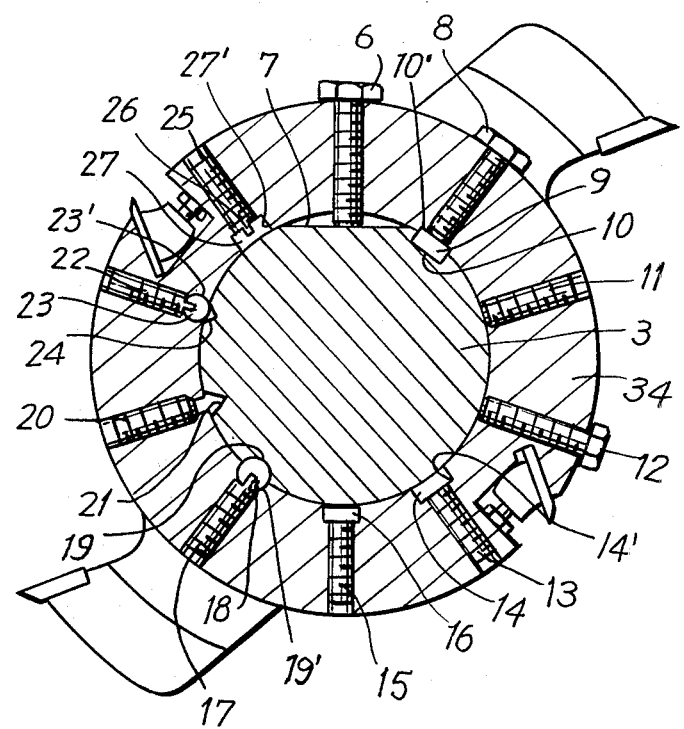
FIG. 5 is a sectional end view of a tool mounted on an axle shaft and showing various arrangements which can be utilized to effect the fastening of a tool in accordance with the teachings of the invention.

Referring now to FIG. 5, there is shown a tool or tool holder 34 mounted on a shaft 3 having a flat 7. Circumferentially spaced about the tool are various embodiments of means for securing the tool on the shaft. Quite obviously all of the different means would not be used on a single tool but they have been depicted in a single figure in order to reduce the number of figures required. A machine screw 6 is shown as being threaded into tool 34. Machine screw 6 has a hexagonal head and the end thereof makes contact with flat 7. A machine screw shown at 8 engages a flat bar 9 which is received in a groove 10 in shaft 3 and in a groove 10' in tool 34. An Allen-head screw 11 is threaded into tool 34 and makes directed contact with the surface of shaft 3. A machine screw 12 is threaded in tool 34 and makes direct contact with shaft 3.

An Allen-head screw 13 engages a bar 14 mounted in a groove 14' in tool 34. Bar 14 engages the surface of shaft 3 and engaging face thereof is contoured to have the same radius as the shaft for intimate contact thereof. A similar arrangement is shown with screw 15 and bar 16 except that the bar 16 has a flat face rather than a contoured face.

Screw 17 engages a generally circular bar 18 which seats in groove 19 in shaft 3 and a groove 19' in tool 34.

A cut of triangular cross-section 21 is adapted to receive the end of screw 20 without any intermediate contacting part. Alternatively, a triangular bar could be provided as an intermediate part.

Screw 22 engages a ball 23 received in a recess 23' in tool 34. A wedge shaped goove 24 is provided in shaft 3 for receiving ball 23.

Screw 25 is provided with a pin end 26 which is received in a bar 27 mounted in a groove 27' in the tool. The face of bar 27 may be contoured to mate with the surface of shaft 3, if desired.

The foregoing are several examples of means for frictionally tightening the tool onto its drive shaft. The number of such means provided and the types used will vary depending upon the application. Where greater cutting forces are anticipated, more and stronger retaining means will be preferred.

It will thus be seen that the objects set forth above, among those made apparent from the preceding description, are efficiently attained and, since certain changes may be made in the above construction without departing from the spirit and scope of the invention, it is intended that all matter contained in the above description or shown in the accompanying drawings shall be interpreted as illustrative and not in a limiting sense.

It is also to be understood that the following claims are intended to cover all of the generic and specific features of the invention herein described, and all statements of the scope of the invention, which, as a matter of language, might be said to fall therebetween.

What is claimed is:

1. A tool fastening system for woodworking machines or the like wherein a tool or toolholder is removably secured on a driven shaft for conjoint rotation comprising radially directed fastening means in said tool or toolholder having a contact end adapted for gripping engagement with said shaft, said fastening means being radially movable into and out of such gripping engagement, and comprising a threaded fastener and an intermediate member acting between said threaded fastener and said driven shaft, said shaft being round, said intermediate member having a cross-section similar to a half-moon and including the area between a first and second intersecting circle, said first circle having the same radius as said shaft, thereby providing for said engagement, said second circle having a lesser radius, said tool or toolholder having a recess of substantially the same radius as said second circle and retaining said intermediate member therein.

2. A tool fastening system as claimed in claim 1, wherein said radially directed fastening means comprises a plurality of axially aligned fasteners.

3. A tool fastening system as claimed in claim 1, wherein said radially directed fastening means comprises a plurality of circumferentially spaced fasteners.

4. A tool fastening system as claimed in claim 1, wherein said intermediate member is axially elongated and is engaged by a plurality of threaded fasteners.

5. A tool fastening system as claimed in claim 1, wherein said intermediate member includes a recessed portion adapted to receive an end of said threaded fastener.

6. A tool fastening system as claimed in claim 1, wherein said recess has an arc in excess of 180 degrees and said second circle has an arc in excess of 180 degrees, whereby said intermediate member is radially constrained within said recess.

* * * * *